Orin M. Anderson
INVENTOR

BY Charles E. Lightfoot
ATTORNEY

Oct. 26, 1971  O. M. ANDERSON  3,615,029
REAR LOADING REFUSE VEHICLE
Filed March 21, 1969  7 Sheets-Sheet 4
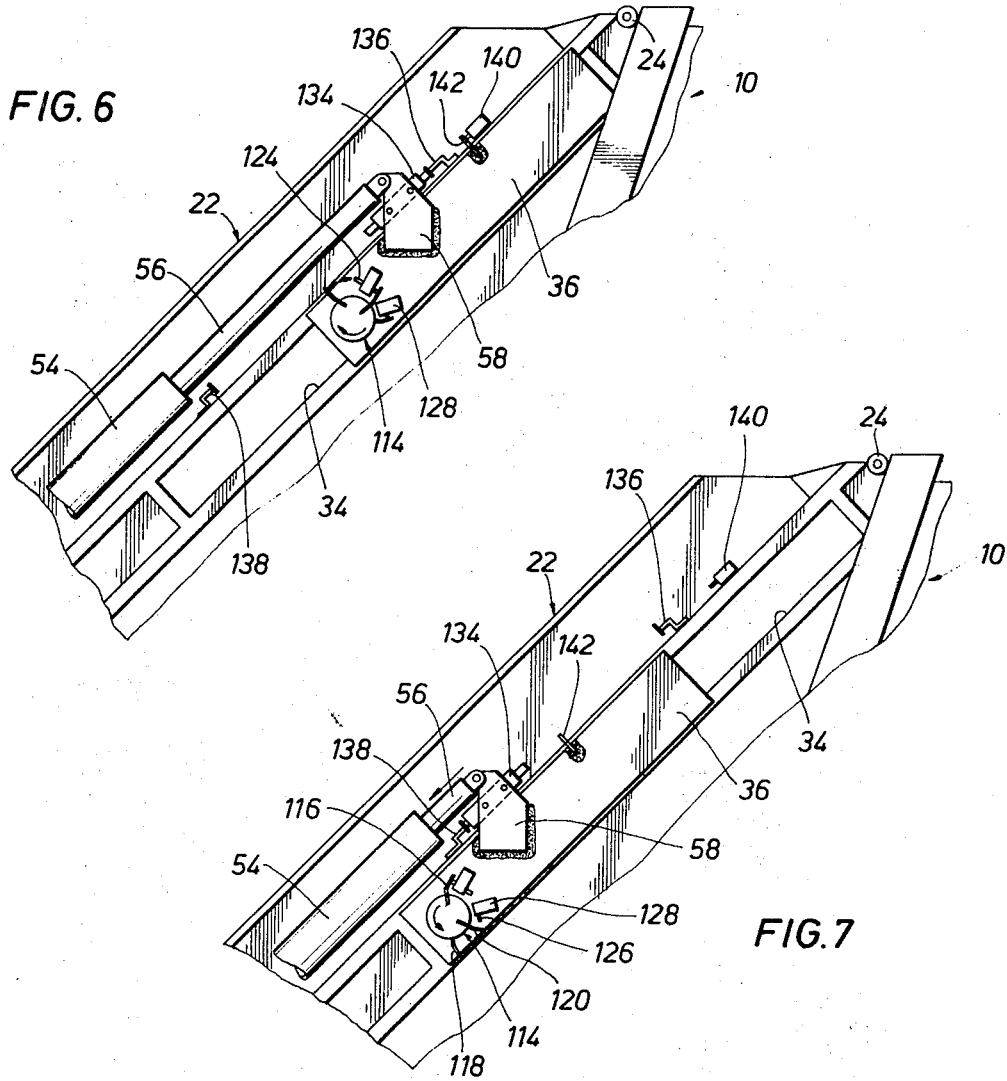
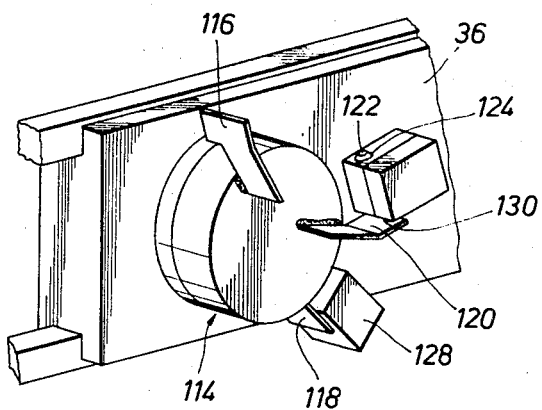
Orin M. Anderson
INVENTOR
BY *Charles E. Lightfoot*
ATTORNEY

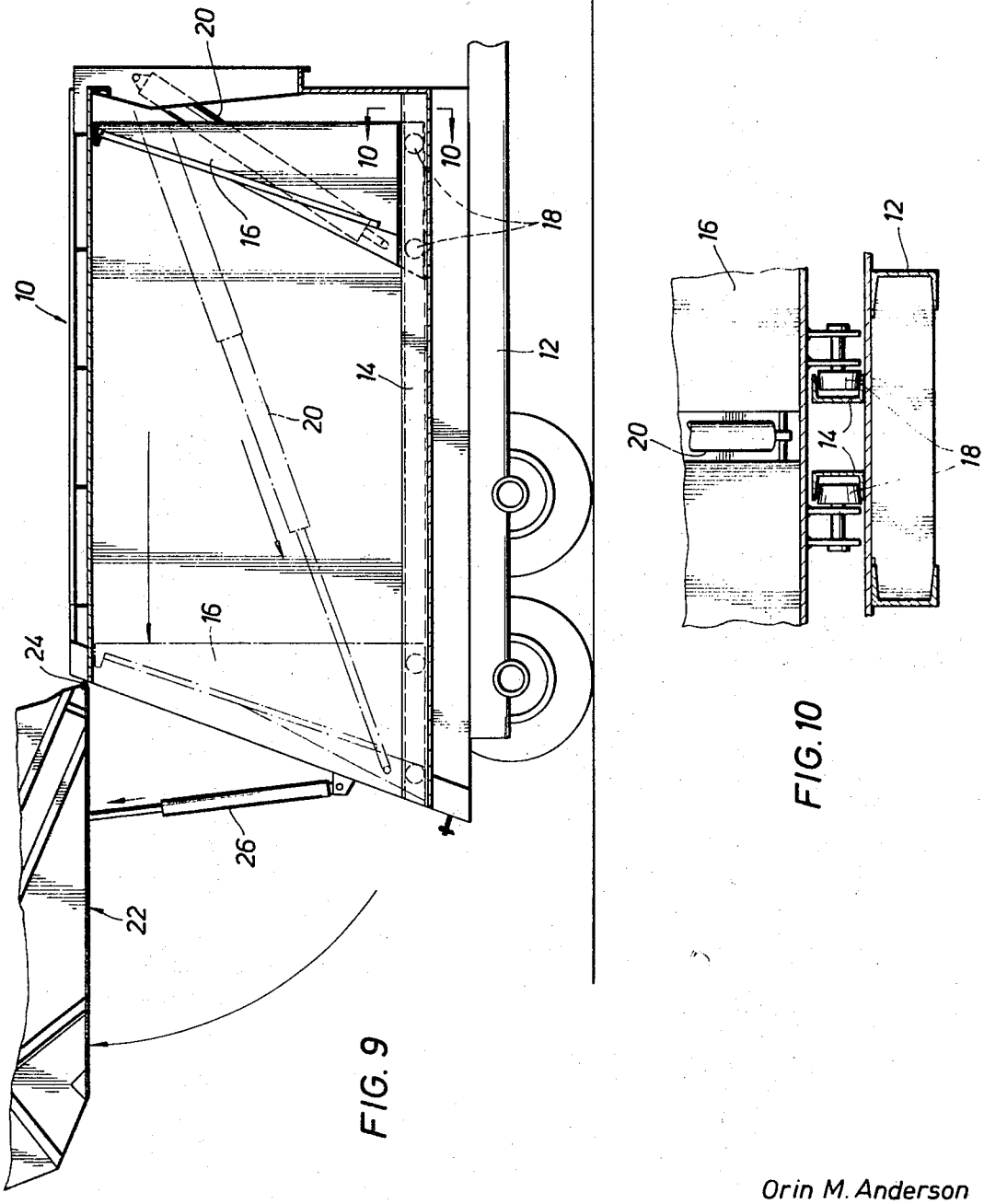

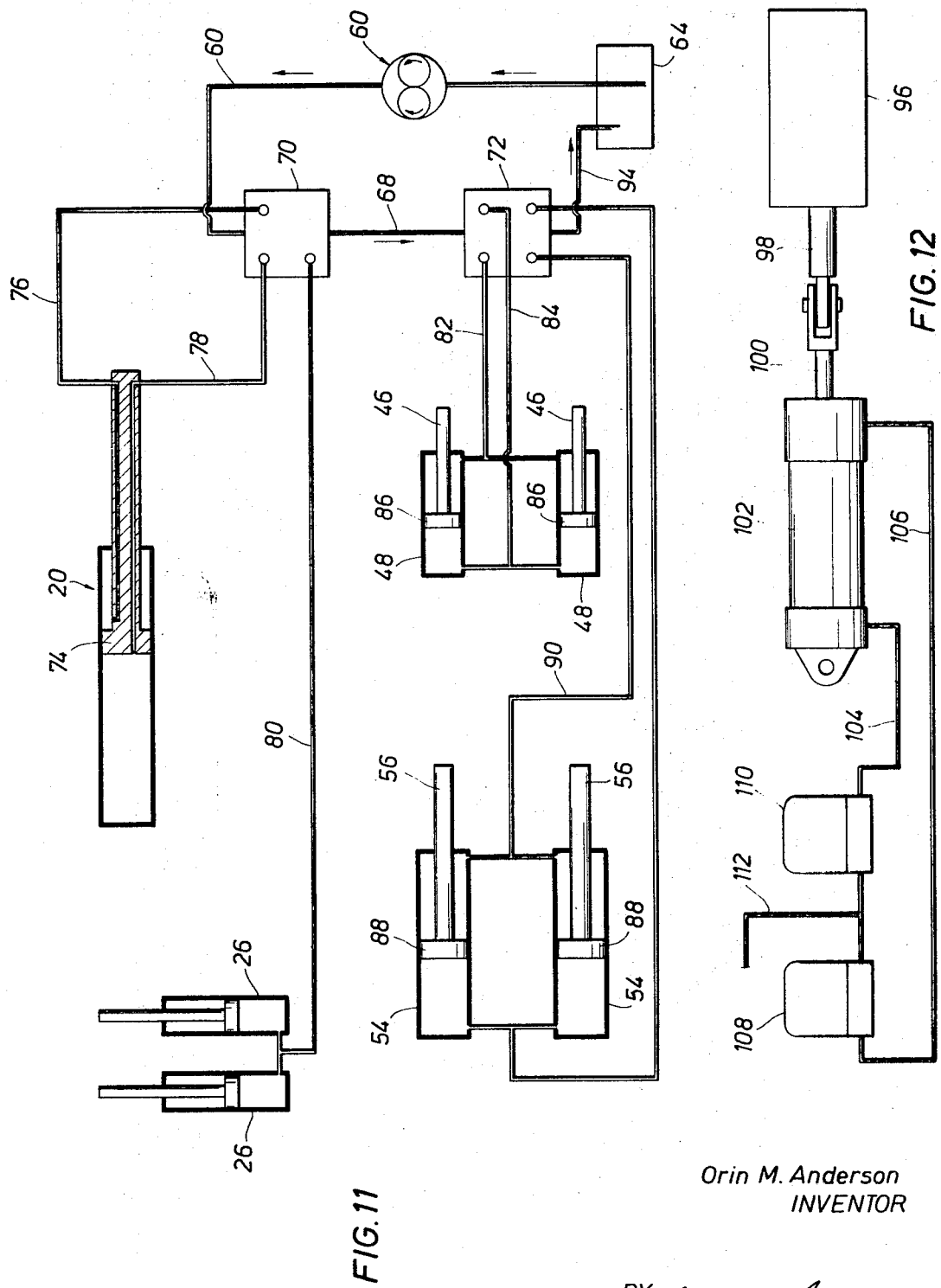

United States Patent Office

3,615,029
Patented Oct. 26, 1971

3,615,029
REAR LOADING REFUSE VEHICLE
Orin M. Anderson, P.O. Box 14147,
San Antonio, Tex. 78214
Filed Mar. 21, 1969, Ser. No. 809,104
Int. Cl. B65f 3/00
U.S. Cl. 214—83.3          1 Claim

ABSTRACT OF THE DISCLOSURE

A rear loading refuse vehicle having a rear end opening, a hollow door hingedly connected to the body for swinging movement into and out of closing relation to the opening and having spaced apart, upright, planar side walls each provided with an upwardly and forwardly inclined slot extending therethrough. Each slot has a slide assembly movably extended therethrough for sliding movement longitudinally in the slot and having means engageable with surface portions of the wall to hold the assembly in the slot. A sweep panel extends between the assemblies in the slots and is movably mounted thereon for movement with the assemblies and for rotation about its upper end to allow the panel to sweep through the hopper to sweep refuse from the hopper and to move upwardly to move the refuse into the body through the opening.

Power means is provided for moving the slide assemblies in the slots and for rotating the sweep panel and means is provided for actuating the power means to move the panel to a lower position and rotate the panel to sweep the refuse from the hopper and move the panel upwardly to move the refuse into the body through the opening.

BACKGROUND OF THE INVENTION

The invention relates to a rear loading refuse vehicle of the type having a hingedly mounted combined rear door, refuse receiver hopper and refuse elevating and packing mechanism therefor.

In the collection and disposal of refuse, vehicles of the rear loader type are frequently employed, having a trough-like hopper or receiver into which refuse is loaded manually and including mechanism operated from the power system of the vehicle, or some other convenient power source, for sweeping the refuse out of the receiver and moving it into the body of the vehicle.

Refuse collecting and compacting mechanism of this character is often embodied in the rear door of the vehicle, which is formed at its lower end with a hopper-like refuse receiver and the door is hingedly connected at its upper end to the rear end of the body for upward swinging movement to its open position, so that the refuse may be unloaded without interference and whereby the load capacity of the vehicle is not diminished by the mounting of the mechanism within the confines of the body.

For the purpose of sweeping the refuse from the receiver and moving it into the body, equipment of this kind is usually provided with a sweep panel which moves through the receiver and lifts the refuse therefrom, and a compaction or ram panel which is mounted for movement across the sweep panel in its elevated position to move the refuse into the vehicle body and compact it therein.

In mechanism of this kind, the sweep and ram panels must be cooridnated in their movements so that they do not interfere with each other and so that the ram panel will be in a position to move refuse from the sweep panel into the body when the sweep panel reaches its elevated position. Moreover, the sweep panel must be returned to a retracted position in which it leaves the receiver open for reloading. Such mechanism involves careful and precise control of its operation and is of relatively complicated construction.

As heretofore commonly constructed, the sweep panel is sometimes mounted for bodily movement along inside tracks mounted on the sides of the door and which are shaped to cause the panel to move along a circuitous path through a loading cycle to sweep refuse from the receiver and move it into the body.

SUMMARY OF THE INVENTION

Briefly described, the rear loading vehicle of the invention comprises a refuse body having a hollow rear door hinged at its upper end to the top of the body for upward swinging movement to open position. Within the body, an ejector panel or blade is movably mounted for longitudinal movement in the body by means of a pressure fluid actuated cylinder.

The rear door has opposite parallel upright sides, each formed with an elongated slot, the slots being parallel and sloping upwardly and forwardly when the door is closed. The door is formed at its lower end with a hopper-like refuse receiver portion which extends across the width of the door opening upwardly and whose forward edge is at the level of the lower edge of the rear opening of the body when the door is closed.

Refuse loading mechanism is mounted in the door, including a sweep panel mounted for swinging movement about a horizontal axis above the receiver, which axis is movable longitudinally along the slots. A shield panel or deflector extends upwardly and forwardly from the axis of rotation of the sweep panel and is movable therewith along the slots. Pressure cylinders are mounted in the door and connected to the swing panel to swing the swing panel through the receiver during upward movement of the swing panel along the slots to an upper position to sweep refuse from the receiver and move the same into the body. The swing panel is movable from the upper position to a position in longitudinal alignment with the shield panel for movement downwardly therewith to a lower position with the shield panel for movement downwardly therewith to a lower position with the lower edge extending into the receiver rearwardly of refuse therein preparatory to the next loading movement of the loading mechanism.

Pressure cylinders are mounted on the exterior of the side walls of the door and connected to the sweep or packer panel at locations to move the sweep panel and the shield panel therewith along the slots of the side walls.

A baffle plate extends across the upper portion of the door in position for coaction with the deflector panel to prevent refuse from falling rearwardly out of the body through the door.

The loading operation is controlled by an electro-pneumatic-hydraulic system in which liquid under pressure is supplied to the pressure cylinders through a piping system under the control of valves which are actuated by pneumatic pressure cylinders under the control of solenoid actuated pilot valves. The control system includes switches for the automatic operation of the mechanism through the loading cycle. Mechanical push-pull type cables, not shown, may also be provided for emergency use or any other abnormal loading problem.

Separate pressure cylinders are provided for opening the rear door and actuation of the ejector plate which may be operated by manual levers independently of the switches of the automatic cycling system.

The invention has for an important object the provision of a rear loading refuse vehicle embodying a rear door of hollow construction hingedly connected at its upper end to the top of the vehicle body for upward swinging movement to an open position and formed at its lower end with a refuse receiver or hopper extending transversely across the door and whose forward edge is positioned at the level of the lower edge of the rear end opening of the body when the door is closed and refuse loading mechanism in the door including a sweep panel mounted for rotational movement about an axis of rotation extending horizontally across the door above the hopper and for bodily movement along an upwardly and forwardly extending path from a lower position with its lower end extending into the hopper rearwardly of refuse therein to sweep refuse from the hopper and move the same upwardly into the body upon forward swinging movement of the sweep panel during such upward movement of the same, and also having a shield panel extending transversely across the door and upwardly from said axis.

Another object of the invention is the provision of a rear loading refuse vehicle of the type referred to in which the rear door is formed with side walls having elongated slots therethrough, along which the axis of rotation of said sweep panel is movable along an upwardly and forwardly sloping path during the forward swinging movement of the sweep panel to move refuse from the hopper into the body.

A further object of the invention is the provision in a rear loading refuse vehicle of the kind mentioned of means for actuating said loading mechanism to cause said sweep panel and deflector plate to move through a loading cycle from an upper position in which said sweep panel and shield panel are at the limit of their upward movement with the sweep panel extending forwardly and downwardly from the lower end of the deflector plate to a lower position in which the sweep panel extends rearwardly and downwardly from the lower end of the deflector plate with the lower edge of the sweep panel extending into the hopper rearwardly of refuse therein, and from said lower position back to said upper position, and including means for causing said sweep panel to swing forwardly from said rearwardly and downwardly extending position to said forwardly and downwardly extending position during such movement from said lower to said upper position to move refuse out of said hopper into said body.

BRIEF DESCRIPTION OF THE VIEWS OF THE DRAWINGS

FIG. 6 is a fragmentary side elevational view, on a somewhat enlarged scale, of a portion of the loading mechanism, showing the location and mode of operation of electrical switch mechanism by which the loading operation is controlled; the mechanism being shown in the initial stage of the loading operation;

FIG. 7 is a view similar to that of FIG. 6, showing the electrical control mechanism in an advanced stage of the loading operation;

FIG. 8 is a fragmentary, perspective view, on an enlarged scale, showing details of structure and arrangement of a portion of the electrical control mechanism;

FIG. 9 is a fragmentary side elevational view, similar to that of FIG. 1, showing the rear refuse loading door of the vehicle in its open position;

FIG. 10 is a cross-sectional view, on a somewhat enlarged scale, taken along the line 10—10 of FIG. 9, looking in the direction indicated by the arrows;

FIG. 11 is a diagrammatic view of the pressure fluid system of the invention;

FIG. 12 is a side elevational view, on a somewhat enlarged scale, of one unit of the electro-pneumatic-hydraulic control valve mechanism of the invention.

DETAILED DESCRIPTION OF A PARTICULAR EMBODIMENT OF THE INVENTION

Figure 1:
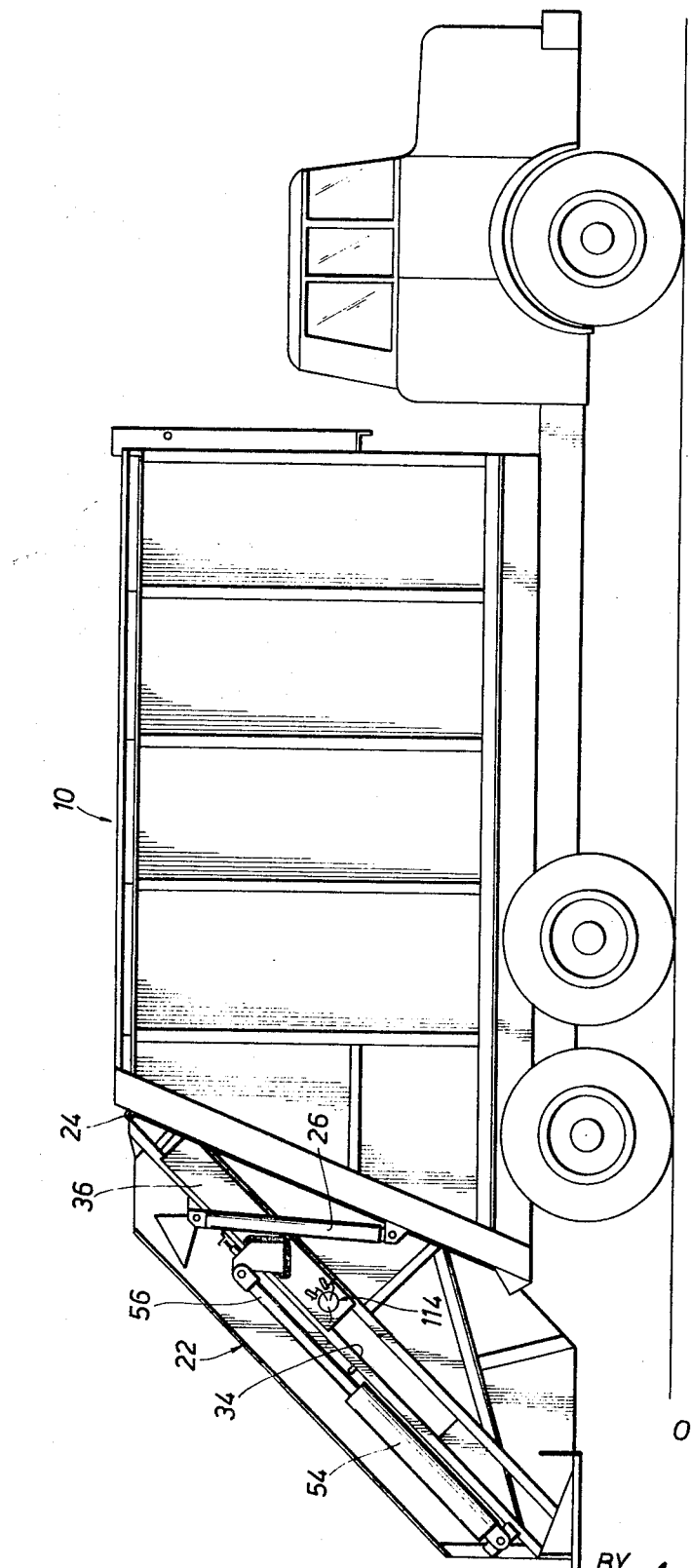
FIG. 1 is a side elevational view of a refuse vehicle illustrating the invention and showing the rear refuse loading door structure of the same in closed condition.

The rear loading refuse vehicle of the invention as illustrated herein comprises a refuse body, generally designated 10, of generally rectangular configuration, mounted on a wheeled frame or chassis 12 (FIG. 9), of a usual type, which may be provided with longitudinally extending, centrally located, parallel trackways 14 of channel shape resting on the floor of the body and upon which an upright ejector plate or panel 16 is movably supported on rollers 18 rollingly engaged with the trackways.

Suitable means is provided, such as the telescoping pressure cylinder assembly 20 connected at one end to the front end of the body and to the ejector, by which the ejector may be moved from a retracted position in the forward end of the body toward the rear end thereof to eject the refuse from the body through its rear end opening.

The vehicle is provided at its rear end with a hingedly mounted door or hopper 22 which carries the rear loading assembly of the invention. The door 22 is connected to the body at the top by suitable hinges 24 to allow the door to swing upwardly to open position, as shown in FIG. 9, and is provided with a pair of external pressure cylinders 26, one at each side of the door, connected at one end to the body and at the other end to the door at locations to raise the door to open position upon actuation of the cylinders.

The door 22 is of hollow construction (FIGS. 2 and 3), opening into the rear end of the body, having side walls 28 and a curved bottom wall 30 forming a refuse loading trough or hopper whose upper front edge 32 is substantially at the level of the floor of the body when the door is closed. The door is open at the rear, above the hopper 30.

Each side wall 28 of the door has an elongated slot 34 therein, the slots of the side walls being arranged parallel, and in each slot an elongated slide member or slide assembly 36 (FIG. 9) is slidably disposed, which extends entirely through the slot from the interior to the exterior of the side wall of the door.

As best shown in FIGS. 6, 7 and 8 each slide assembly 36 and the associated slot 34 formed in each side wall of the hopper 22 together provide a tongue and groove sliding connection which assures smooth operation of the slide assembly and serves to hold the slide assembly in longitudinal alignment within the slot.

A sweep panel 40 is disposed between the side walls 28 and is rotatably carried on the slide members 36 as by means of trunnions, or the like.

The sweep panel 40 is conveniently formed with a flat front wall 42 of sheet-like material, such as sheet steel, and has at each side a side portion 44 of generally triangular shape which serves as a reinforcement for the front wall and also provides a lever arm or lug for the pivotal attachment thereto of the piston rod 46 of a pressure cylinder 48, one of which is provided at each side of the sweep panel and within the interior of the wall. The the interior pressure cylinders 48 are suitably connected to the upper end of a slide assembly or slide frame as by means of pins 52 thereon which are connected to the slide members 36 for sliding movement therewith between the side walls 38 of the door to a lower position, shown in FIG. 3, and to an upper position, shown in FIG. 4.

The slide members 36 are movable longitudinally in the slots 34 by pressure cylinders 54 located on the door exteriorly of the side walls 28, and whose lower ends are connected to the door near the lower end thereof and whose piston rods 56 are connected to lugs 58 in the slide members.

Figure 4:
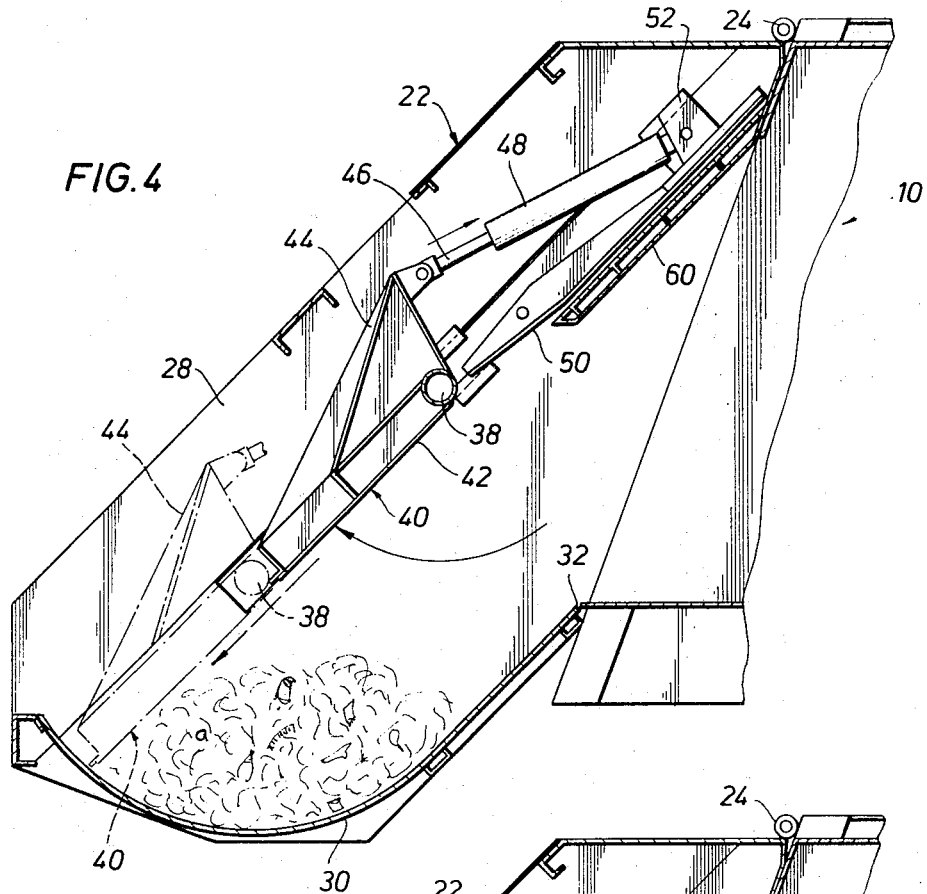
FIG. 4 is a view similar to that of FIG. 3, showing the refuse loading mechanism in an initial stage of the loading operation.
Figure 5:
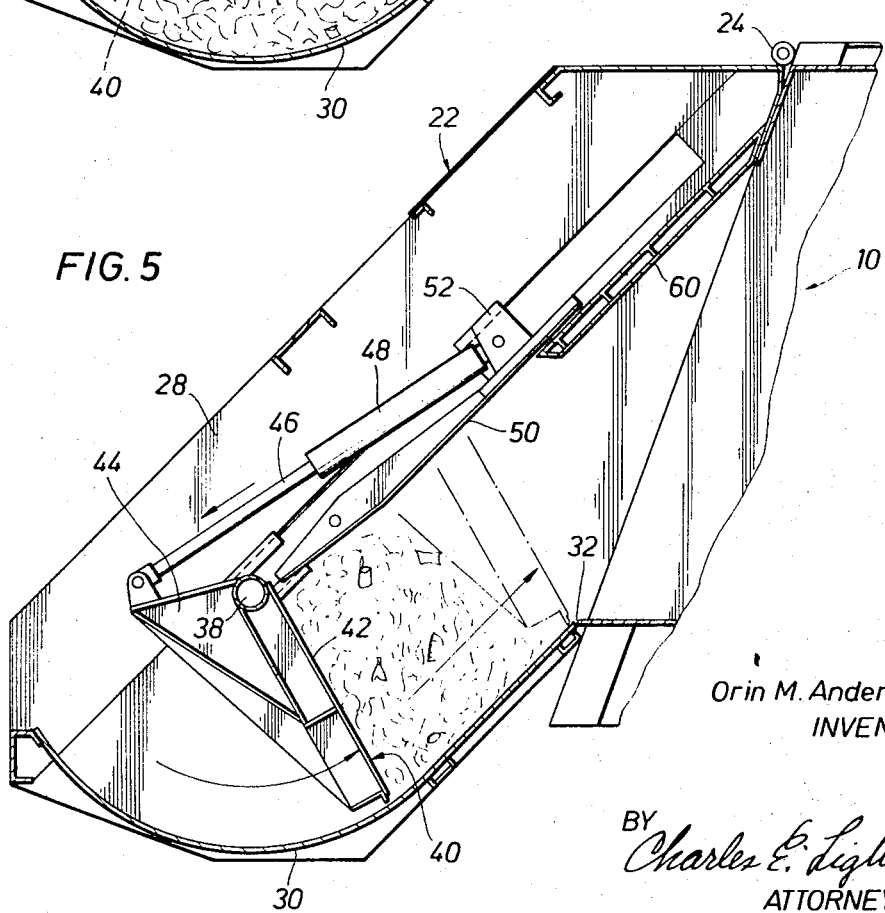
FIG. 5 is a view similar to that of FIG. 3 showing the refuse loading mechanism in an advanced stage of the loading operation.
Figure 13:
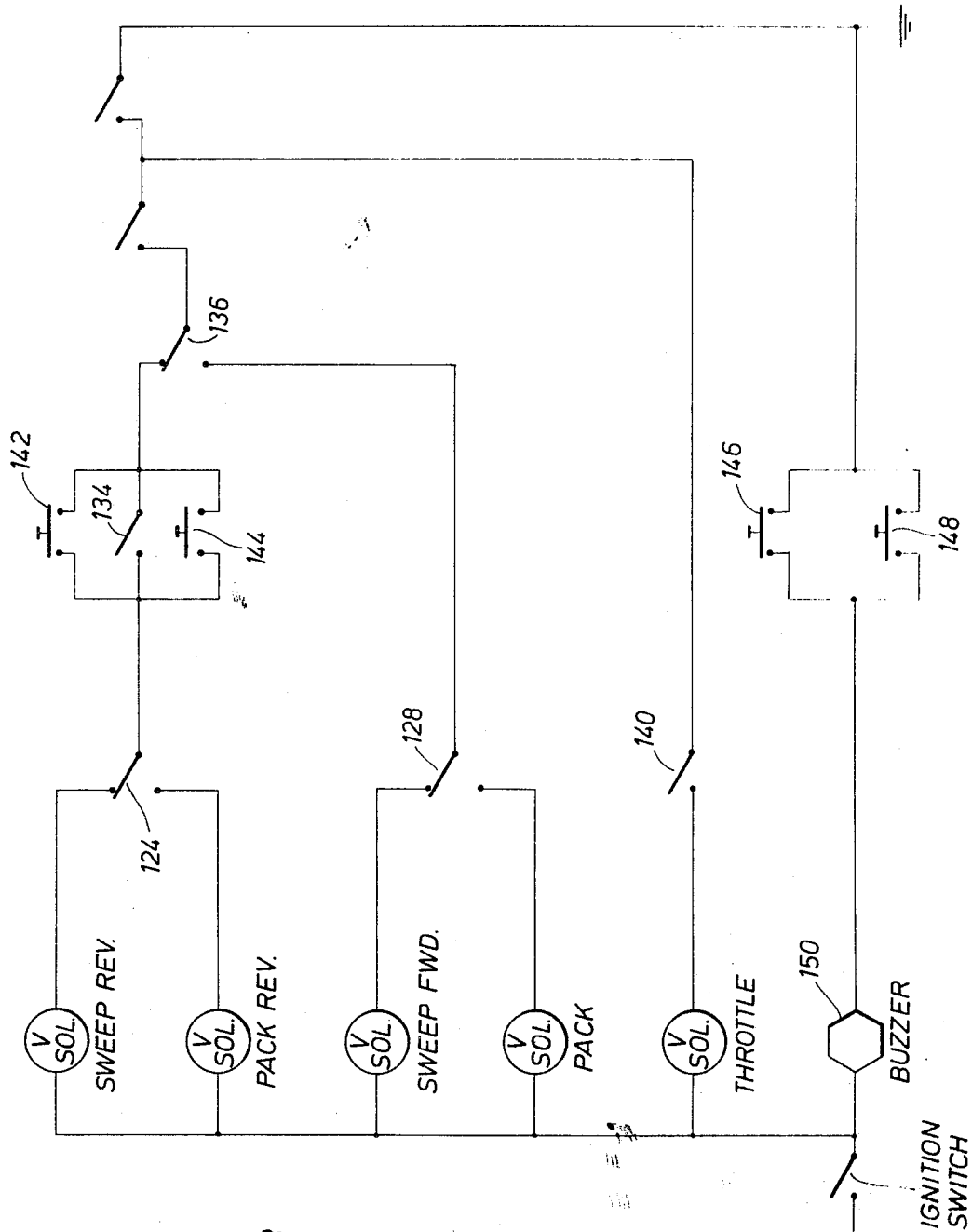
FIG. 13 is an electrical circuit diagram of the electrical control system of the invention.

By this construction, the cylinders 54 may be actuated to move the slide assemblies and deflector plate and sweep panel 40 downwardly with the sweep panel positioned in alignment with the deflector plate as shown in FIG. 4, to move the sweep panel into a retracted position in the bottom hopper of the door, as seen in dotted lines in FIG. 4, after which the sweep panel may be moved by actuation of the cylinders 48 to the position shown in FIG. 5 to sweep refuse upwardly in the hopper bottom, whereupon the cylinders 54 may be again actuated to move the deflector plate and sweep panel upwardly to the position shown in dotted lines in FIG. 5 to move the refuse into the body of the vehicle. A baffle plate 60 is disposed above the hopper bottom of the door between the side walls 28 and over which the shield plate 50 is slidable upon upward movement of the slide assemblies as seen in FIG. 5, the baffle plate and shield plate are thus positioned for coaction to prevent refuse in the body from coming back out of the body through the door.

The pressure cylinders 26 by which the rear door 22 is elevated, the cylinders 48 for actuation of the sweep panel 40, and the cylinders 54 by which the refuse lifting and packing mechanism is moved longitudinally along the slots 34, are connected into a hydraulic system shown diagrammatically in FIG. 11, and the pressure cylinder assembly 20 for operation of the ejector plate 16 is also connected into the hydraulic system. The hydraulic system has a pressure pump 60 located in a liquid supply line 62 leading from a reservoir 64 and from which liquid under pressure is supplied to the cylinders through flow lines 66 and 68 under the control of suitable valve mechanism diagrammatically represented at 70 and 72.

From the valve mechanism 70, fluid from the pump may flow into and out of the cylinder assembly 20 on opposite sides of the piston 74 thereof, through pipes 76 and 78, under the control of valves, whereby fluid is supplied to the assembly to extend or retract the assembly to move the ejector blade either toward or away from the rear end of the vehicle body.

A fluid flow line 80 leads from the valve mechanism 70 to the pressure cylinders 26 under the control of suitable valve means for supplying fluid to these cylinders to swing the rear door 22 upwardly to open the same, the door being movable downwardly by gravity to return the fluid through the pipe 80 when the door closes.

Fluid supply pipes 82 and 84 are provided through which pressure fluid is supplied under the control of suitable valves to either side of the pistons 86 of the cylinders 48 to actuate the sweep panel 40.

Similarly, pressure fluid is supplied to the cylinders 54 one either side of the pistons 88 therein, through flow lines 90 and 92 for actuation of the slide members 36 of the refuse lifting and packing mechanism.

A return pipe 94 leads from the valve mechanism 72 back to the reservoir 64 whereby pressure fluid is returned to the reservoir during operation of the system.

The valves by which the supply of pressure fluid to the various cylinders and the return of fluid therefrom is controlled may be of a conventional type, such as spool or plug type valves, which may be actuated by means of pressure fluid cylinders, such as pneumatically actuated cylinders, under the control of suitable pilot valves actuated by electrical solenoids. The system thus becomes an electro-pneumatic-hydraulic system having control valve mechanism of the kind illustrated in FIG. 12. The control valves of the system may for convenience be arranged in banks, positioned at some suitable location for the most effective connection of the piping leading to and from the various pressure cylinders and for ready accessability for purposes of replacement or repair. Such an arrangement possesses the advantage of compactness and efficiency in operation, since the pilot valves may be relatively small and easily operated by solenoids, while the pneumatic cylinders may be supplied with compressed air at relatively high pressure to operate the hydraulic valves. The pilot valves may be formed as integral parts of the solenoids.

As seen in FIG. 12, each of the hydraulic valves, such as the sliding spool or plug valve 96, has a valve rod 98 which is connected to the piston rod 100 of a pneumatic cylinder 102 for actuation thereby. The cylinder 102 is supplied with pressure fluid, such as compressed air on either side of the piston therein, by pipes 104 and 106, under the control of solenoid pilot valves 108 and 110, from a suitable pressure source through a supply pipe 112. The solenoid operated pilot valves 108 and 110 are of a conventional type and may be operated from the electrical power source of the vehicle.

Switch actuating means generally designated 114 (FIG. 6) is provided, rotatably mounted on one of the slide members 36 for bodily movement therewith and connected to the sweep panel 40 for rotation therewith about the pivotal axis of the panel, which actuator has arms or lugs 116, 118 and 120 extending radially therefrom. The arm 116 is positioned for engagement with the plunger 122 of a switch 124 to depress the plunger when the actuator reaches a predetermined position of its clockwise movement as viewed in FIG. 8, and to release the plunger 122 upon counterclockwise movement of the actuator. Similarly, the arm 118 is positioned to actuate the plunger 126 of a switch 128 upon counterclockwise rotation of the actuator and to release the same upon clockwise rotation thereof, and arm 120 is positioned to pass switch 128 and engage the plunger 130 of another switch 134, mounted with the switch 124, to actuate plunger 130 upon counterclockwise rotation of the actuator 114 and to release plunger 130 upon clockwise rotation of the actuator.

Additionally, a switch 136 is mounted on the slide member 36, which switch has upper and lower oppositely directed plungers, the upper plunger being positioned for engagement with an upper bumper or stop 136 to depress the plunger when the slide member reaches the upper limit of its movement, and the lower plunger being positioned for engagement with a lower bumper or stop 138 to depress the lower plunger when the slide member reaches the lower limit of its movement.

A switch 140 is also mounted on the side wall of the rear door 22 upwardly beyond the upper bumper 136 and having a plunger positioned for engagement with a bumper 142 to depress the plunger when the slide member 36 reaches the upper limit of its movement.

Additional switches 142 and 144, connected in parallel with the switch 134, may be suitably mounted one on each side of the vehicle at convenient locations to be operated by persons on the ground at either side of the vehicle to initiate operation of the refuse loading and compacting mechanism. Similarly, switches 146 and 148 may also be provided located on opposite sides of the vehicle in position for actuation by persons on the ground on either side of the vehicle to actuate a suitable signal such as a buzzer 150 to indicate the initiation of the operation of the equipment from outside of the cab of the vehicle.

Figure 2:
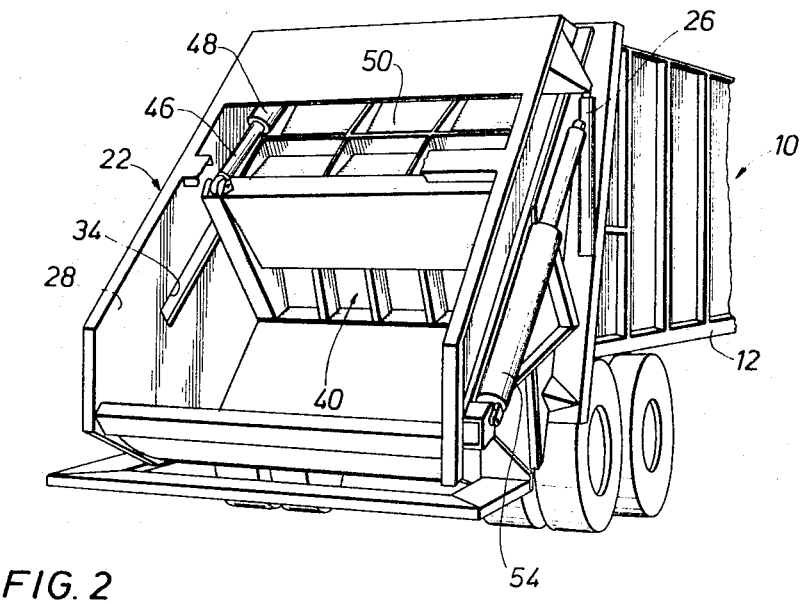
FIG. 2 is a rear perspective view of the invention showing the refuse loading mechanism at the end of a refuse loading stage of its operation and ready for the collection of additional refuse.
Figure 3:
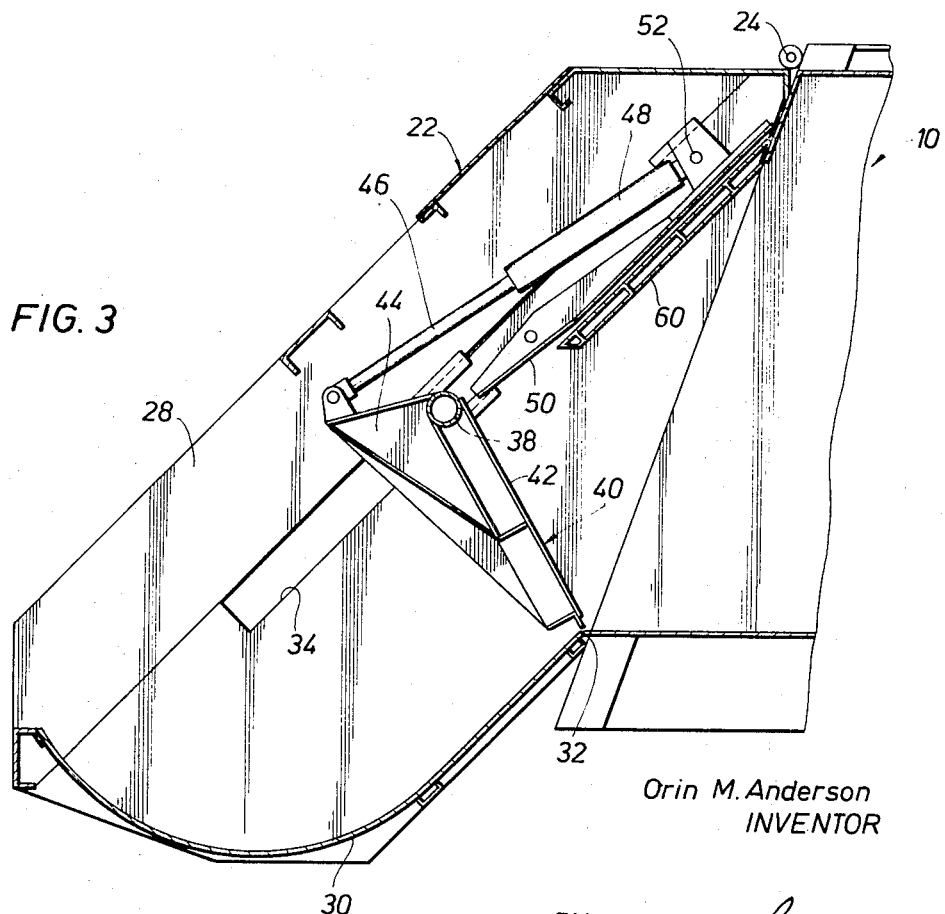
FIG. 3 is a longitudinal, vertical, central, cross-sectional view of the invention as illustrated in FIG. 2, on a somewhat enlarged scale.

In operation of the vehicle, the refuse loading mechanism will be at rest in the position illustrated in FIGS. 2 and 3 during the time that the hopper 30 is being filled with refuse, in the usual manner, as during a collection trip with the vehicle along a street. When the hopper has been filled with refuse to the desired extent, the loading mechanism is actuated, whereupon the sweep panel 40 is rotated rearwardly from the position of FIG. 3 to that of FIG. 4 by operation of the cylinders 48, to bring the sweep panel into substantially planar alignment with the deflector plate 50 above the hopper.

From the position shown in solid lines in FIG. 4, the loading mechanism is then moved downwardly to the dashed line position shown in FIG. 4, by operation of the cylinders 54 which move the slide assemblies, deflector plate and sweep panel downwardly and rearwardly to position the lower edge portion of the sweep panel along the rear edge portion of the hopper preparatory to the refuse loading movement of the mechanism.

With the mechanism in the dash line position of FIG. 4, the sweep panel is then rotated forwardly by operation of the cylinders 48 to sweep the sweep panel through the curved bottomed portion of the hopper to push the refuse upwardly therefrom, whereupon the sweep panel and deflector plate are moved forwardly and upwardly as shown in dash lines in FIG. 5 to lift and compact the refuse into the body.

It will thus be seen that the loading mechanism moves through a cycle of operation from the position of FIG. 3 through those of FIGS. 4 and 5, and returns to the position of FIG. 3, and that this cycle takes place automatically once initiated. By this construction, the rear part of the door structure is placed in an open and easily accessible condition to be filled with refuse, which is then quickly lifted and loaded into the body of the vehicle, leaving the hopper open to receive further refuse.

The unloading of the vehicle is accomplished by swinging the entire rear door, and the loading mechanism therewith, upwardly about its top hinge by operation of the cylinders 26 to open the rear end of the body fully, whereupon the ejector plate 16 may be actuated to eject the refuse from the body.

I claim:

1. In a refuse vehicle having a hollow body formed with a rear end opening,
 a hopper hingedly connected to the body for swinging movement into and out of closing relation to said opening and having spaced apart, upright, planar side walls, each formed with an elongated, upwardly and forwardly inclined slot extending therethrough;
 a slide assembly mounted in each slot for longitudinal movement therein, each slide assembly having portions extending to opposite sides of the side walls;
 said slot and slide assemblies including a mating top and bottom tongue and groove, respectively, to hold the slide assembly in longitudinal alignment with the slot;
 a sweep panel extending between and movably mounted on said assemblies for rotation about its upper end, and for movement with said assemblies longitudinally of said slots toward a position in which the panel is sweepingly rotatable in the hopper to lift refuse therefrom and away from said position to move such refuse into the body through said opening;
 a first pair of piston and cylinder means located outside the side walls and being attached to each slide assembly on the outside of each side wall for sequentially moving said panel forwardly and rearwardly;
 a second pair of piston and cylinder means located inside the piston walls and being attached to each slide assembly on the inside of each side wall for sequentially moving the panel downwardly at the rear of the hopper and forwardly at the front of the hopper;
 means for sequentially actuating said piston and cylinder means; and
 a shield plate extending between and connected to said assemblies for longitudinal movement therewith and extending upwardly from said panel in position to hold refuse against rearward movement past the upper end of the panel in all positions of the panel.

References Cited
UNITED STATES PATENTS

| | | | |
|---|---|---|---|
| 2,733,972 | 2/1956 | Diack | 308—3.6 |
| 3,486,646 | 12/1969 | O'Brien et al. | 214—82 |
| 3,143,230 | 8/1964 | Gollnick | 214—83.3 X |
| 3,348,708 | 10/1967 | Gollnick | 214—83.3 |

ALBERT J. MAKAY, Primary Examiner